(12) United States Patent
Sharma

(10) Patent No.: US 9,357,081 B2
(45) Date of Patent: May 31, 2016

(54) METHOD FOR CHOOSING AN ALTERNATE OFFLINE CHARGING SYSTEM DURING AN OVERLOAD AND APPARATUS ASSOCIATED THEREWITH

(75) Inventor: Ranjan Sharma, New Albany, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 890 days.

(21) Appl. No.: 12/946,394

(22) Filed: Nov. 15, 2010

(65) Prior Publication Data
US 2012/0123914 A1    May 17, 2012

(51) Int. Cl.
*H04M 15/00*    (2006.01)
*G06Q 40/00*    (2012.01)

(52) U.S. Cl.
CPC .............. *H04M 15/00* (2013.01); *G06Q 40/12* (2013.12); *H04M 15/31* (2013.01); *H04M 15/53* (2013.01); *H04M 15/57* (2013.01); *H04M 15/65* (2013.01); *H04M 15/70* (2013.01); *H04M 15/73* (2013.01); *H04M 15/74* (2013.01); *G06Q 2220/123* (2013.01)

(58) Field of Classification Search
None
See application file for complete search history.

(56) References Cited

U.S. PATENT DOCUMENTS

| | | | |
|---|---|---|---|
| 8,051,171 B2 * | 11/2011 | Batni et al. | 709/226 |
| 2006/0069780 A1 | 3/2006 | Batni et al. | |
| 2008/0299944 A1* | 12/2008 | Cai | 455/406 |

OTHER PUBLICATIONS

RFC 3588; Diameter Base Protocol; Calhoun et al.; Sep. 2003; 147 pages.

* cited by examiner

*Primary Examiner* — Fahd Obeid
(74) *Attorney, Agent, or Firm* — Fay Sharpe LLP

(57) ABSTRACT

A method for using a charging system to account for service provided by a network element in a service provider network is provided. The method may include storing load information records for multiple charging control function (CCF) servers at the CCF servers, receiving status messages from the multiple CCF servers at the CCF servers in conjunction with operation of the CCF servers in a charging system, and updating load status and timestamp fields in the load information records for the status messages received cyclically. The load information records being accessible to the select CCF server for selecting at least one alternate CCF server after the select CCF server determines it is too busy to process some accounting request (ACR) from some network element. The select CCF server may include a peer characteristics storage module, a charging system communication module, and a status message parsing module.

29 Claims, 8 Drawing Sheets

| NODE-ID | TIMESTAMP | STATUS | CPU LOAD | THRESHOLD | TOLERANCE |
|---|---|---|---|---|---|
| IP ADDRESS 1 | TS1 | NORMAL | X% | T1-1 | T2-1 |
| IP ADDRESS 2 | TS2 | OVL | Y% | T1-2 | T2-2 |
| IP ADDRESS 3 | TS3 | OVL | Z% | T1-3 | T2-3 |

FIG. 2

| NODE-ID | TIMESTAMP | STATUS | CPU LOAD | THRESHOLD | TOLERANCE |
|---|---|---|---|---|---|
| IP ADDRESS 1 | TS1 | NORMAL | X% | T1-1 | T2-1 |
| IP ADDRESS 2 | TS2 | OVL | Y% | T1-2 | T2-2 |
| IP ADDRESS 3 | TS3 | OVL | Z% | T1-3 | T2-3 |

FIG. 3

| NODE-ID | TIMESTAMP | STATUS | CPU LOAD | THRESHOLD | TOLERANCE |
|---|---|---|---|---|---|
| IP ADDRESS 1 | TS1 | NORMAL | X% | T1-1 | T2-1 |
| IP ADDRESS 2 | TS2 | OVL | Y% | T1-2 | T2-2 |
| IP ADDRESS 3 | TS3 | NORMAL | Z% | T1-3 | T2-3 |

METHOD FOR CHOOSING AN ALTERNATE OFFLINE CHARGING SYSTEM DURING AN OVERLOAD AND APPARATUS ASSOCIATED THEREWITH

BACKGROUND

This disclosure relates to use of a charging system to account for service provided by a network element in a service provider network. For example, this disclosure describes exemplary embodiments of a method for using a charging system to account for service provided by a network element in a service provider network and exemplary embodiments of apparatus associated therewith. A charging control function (CCF) server in the charging system maintains load information records for CCF servers in the charging system so that when it is too busy to respond to an accounting request (ACR) from a network element (i.e., overload condition), it can provide the network element with at least one alternate CCF in an accounting answer (ACA) to the network element which may be used in a failover process by the network element to resend the ACR to the suggested alternate CCF. This disclosure describes the related communications of status messages between the CCF servers in the charging system. The related exchange of ACAs in response to ACRs is also disclosed herein. The various embodiments are described in relation to accounting for service provided by a network element of an internet protocol (IP) multimedia subsystem (IMS) network during an IMS session. However, the methods and apparatus described herein may be use to account for services provided in other types of networks and for other types of communication sessions.

By way of background, RFC 3588 describes the base Diameter protocol that lays the foundation of charging in IMS, long term evolution (LTE), and other domains for both online as well as offline charging for IMS sessions. While using the Diameter protocol on the Rf reference point, a network element (NE) that implements a charging trigger function (CTF) communicates service charges by sending ACRs toward the charging collection function (CCF). The CCF responds by sending ACAs back to the CTF. This provides reliability on a per message basis.

In certain cases, the sending entities can overwhelm the CCF. For example, when the network experiences a high traffic volume beyond its engineered capacity, the CCF may become overloaded. Also, when the network experiences outage of one or more servers that implement the CCF functionality, the CCF may become degraded. A combination of both of these conditions could easily result from attempts to compensate for overloaded or degraded conditions.

Each CCF server provides an inherent load management scheme. As provided in RFC 3588, the load management scheme allows a CCF to respond to CTFs by sending an indication of overload in a Result-Code parameter of the ACA response. For the overload condition, the CCF responds with the Result-Code set to 3004 in the ACA message, the Result-Code signifies a "DIAMETER_TOO_BUSY" condition at the CCF. Upon receipt of this 3004 Result-Code, the CTF should attempt to send the ACR message to an alternate peer using a failover procedure in accordance with RFC 3588.

However, this gives rise to a direct and at least two dependent issues. The direct issue is that the indication in the Result-Code does not state or suggest one or more alternate peers that can be tried by the CTF for reliable transmission of the ACR. This means the CTF has to find an alternate peer "blindly" and may stumble upon the same overload situation at the alternate peer as well. The derived issue is that without this indication, the CCF server nodes may end up producing several 'Incomplete CDRs' for the same IMS session and thereby cause additional issues for the downstream mediation by the billing system. Secondly, the CTF may prolong the recovery of an overloaded or nearly overloaded CCF server if it is chosen as an alternate peer. This may be detrimental from an overall network sanity perspective and may have a rippling effect from the CCF in which the condition originated.

The existing behavior, as allowed in the RFC 3588, is for the CTF to seek an alternate peer that would allow a reliable reception of the ACR. For example, a first overload indication may result in the following messaging:

CTF→ACR→CCF1
CTF←ACA (3004)←CCF1 (overload)

A second try with an alternate peer CCF may result in the following messaging:

CTF→ACR→CCF2
CTF←ACA←CCF2 (success!) or
CTF←ACA (3004)←CCF2 (overload!)

So, if CCF2 can receive the ACR, then the problem is somewhat mitigated. However, in a network, it is likely that when one CCF is experiencing overload, other CCF servers are similarly experiencing overload or near overload conditions. Therefore, it would not be unusual that CCF2 also provides an overload indication. Under these circumstances, the CTF would have to search for a different alternate peer that can receive the accounting message.

A tertiary (i.e., third) try with another alternate peer CCF may result in the following messaging:

CTF→ACR→CCF3
CTF←ACA←CCF3 (success!) or
CTF←ACA (3004)←CCF3 (overload!)

As before, CCF3 may likewise be overloaded and may refuse the ACR.

Additionally, an initial success indication from an alternate peer is no guarantee that this CCF has the spare capacity to handle the remaining session. For, it may itself be on the verge of going into an overload situation, and may refuse to handle subsequent messages after having accepted the first message:

CTF→ACR→CCF3
CTF←ACA←CCF3 (success!)
. . .
CTF→ACR→CCF3
CTF←ACA (3004)←CCF3 (overload!)

The example given above is a simplified example. In a network deploying approximately tens of servers providing the CCF functionality, the process of selecting an alternate peer in case of overload can be cumbersome and prone to trial and error.

Thus, it can be seen that the "blind" search can lead to increased traffic in the network. This mechanism also gives rise to each CCF that successfully receives at least one ACR from part of the IMS session having to create an "Incomplete" CDR. Under these circumstances, the complete IMS session accounting is not available at any server and "Incomplete" CDRs from two or more servers must be reconciled downstream to determine the total billing amount attributed to the CTF for the IMS session. Downstream, it becomes a chore for the billing mediation to collapse several incomplete CDRs into a single IMS session-specific CDR to bill the subscriber for the service provided by the CTF.

The drawbacks of the current standards are summarized as follows: i) the search for an alternate peer is blind and the first alternate peer sought may not have the processing bandwidth to accommodate the ACR, ii) additional network traffic is generated via the blind search, iii) incomplete CDRs are created at all the CCFs successfully receiving at least one ACR from the CTF during the IMS session, iv) additional processing is incurred at all CCFs touched by the CTF during the IMS session, and v) additional processing is incurred at the back-end billing mediation to merge the incomplete CDRs for a full IMS session into a complete CDR. Of these, the biggest offender is the blind search for an alternate peer. Clearly, an intelligent search for an alternate peer CCF with sufficient left-over processing capacity that reduces the number of incomplete CDRs associated with the CTFs for the IMS session is desirable over current techniques.

With reference to FIG. 1, a CTF is first connected to CCF1. After accepting a Start ACR or at least one Interim ACR, an ACR (1) is responded to with an error code in the Result-Code AVP (i.e., AVP Code 268) of the ACA. The CTF then connects to alternate peer CCF2, which is also experiencing high load conditions. After accepting one or more ACRs from the CTF, CCF2 provides a similar overload indication, forcing the CTF to seek a connection to alternate peer CCF3. In this exemplary scenario, CCF3 can accommodate the ACR processing and does not return an overload indication. Under this scenario, all three CCFs generate an Incomplete CDR (4, 5 and 6) that is communicated to billing mediation (BM).

Based on the foregoing, techniques that enable a CCF server in a charging system to identify or recommend alternate CCF servers when it is experiencing an overload condition is desirable. Additionally, it is desirable that information regarding these alternate CCF servers be incorporated in the ACA to a network element that has sent an ACR to a CCF server currently experiencing an overload condition.

SUMMARY

In one aspect, a method for using a charging system to account for service provided by a network element in a service provider network is provided. In one embodiment, the method includes: storing a load information record for each of at least some of a plurality of CCF servers at a first CCF server, each load information record at least including an identifier field for identifying the corresponding CCF server, a load status field for storing one or more load status received in status messages from the at least some CCF servers, and a timestamp field for storing timestamps associated with the corresponding status messages; receiving a status message from each of the at least some CCF servers at the first CCF server in conjunction with operation of the plurality of CCF servers in a charging system, the charging system including the plurality of CCF servers for processing ACRs from one or more network elements of a service provider network during one or more communication sessions via the service provider network, each status message at least including an identifier for the corresponding CCF server from which the status message was broadcast, at least a most recent load status for the corresponding CCF server, and a timestamp associated with the status message; and updating the load status and timestamp fields in the load information record associated with each CCF server for which status messages were received to store at least the most recent load status and timestamp values from the status message in the corresponding load information record, the load information records being accessible to the first CCF server for selecting at least one alternate CCF server after the first CCF server determines it is too busy to process some ACR from some network element.

In another embodiment, the method for using a charging system to account for service provided by a network element in a service provider network includes: storing a normal range for at least one load characteristic, a first threshold value, and a second threshold value at a first CCF server, each at least one load characteristic associated with operation of the first CCF server in conjunction with operation of a charging system, the charging system including a plurality of CCF servers for processing ACRs from one or more network elements of a service provider network during one or more communication sessions via the service provider network, the first threshold value indicative of a moderate overload condition at the first CCF server, and the second threshold value indicative of a severe overload condition at the first CCF server; monitoring actual values for each at least one load characteristic of the first CCF server at the first CCF server during operation of the charging system; determining a load status of the first CCF server at the first CCF server during the operation of the charging system based at least in part on the actual values and normal range for each at least one load characteristic, the first threshold value, and the second threshold value; and broadcasting a status message from the first CCF server to at least some of the plurality of CCF servers, the status message at least including an identifier for the first CCF server, at least a most recent load status for the first CCF server, and a timestamp associated with the status message.

In yet another embodiment, the method for using a charging system to account for service provided by a network element in a service provider network includes: receiving an ACR from a network element of a service provider network at a first CCF server in a charging system, the ACR associated with service provided by the network element in a service provider network in conjunction with a communication session, the charging system including a plurality of CCF servers for processing ACRs from one or more network elements of the service provider network during one or more communication sessions via the service provider network; determining the first CCF server is too busy to process the ACR from the network element; selecting at least one alternate CCF server from at least some of the plurality of CCF servers based at least in part on at least a most recent load status and an associated timestamp received from the corresponding CCF server and stored in load information records at the first CCF server; and sending an ACA from the first CCF server to the network element, the ACA indicating the first CCF server is too busy to process the ACR and identifying each at least one alternate CCF server selected.

In still another embodiment, the method for using a charging system to account for service provided by a network element in a service provider network includes: sending an ACR from a network element of a service provider network to a first CCF server of a charging system, the ACR associated with service provided by the network element in a service provider network in conjunction with a communication session, the charging system including a plurality of CCF servers for processing ACRs from one or more network elements of the service provider network during one or more communication sessions via the service provider network; receiving an ACA from the first CCF server at the network element, the ACA indicating the first CCF server is too busy to process the ACR, identifying at least one alternate CCF server and providing at least a most recent load status for each corresponding alternate CCF server; selecting a second CCF server based at least in part on the at least one alternate CCF server identified in the ACA received from the first CCF server; and re-sending the ACR from the network element to the second CCF.

In another aspect, a first CCF server associated with using a charging system to account for service provided by a network element in a service provider network is provided. In one embodiment, the first CCF server includes: a peer characteristics storage module for storing a load information record for each of at least some of a plurality of CCF servers, each load information record at least including an identifier field for identifying the corresponding CCF server, a load status field for storing one or more load status received in incoming status messages from the at least some CCF servers, and a timestamp field for storing timestamps associated with the corresponding incoming status messages; a charging system communication module for receiving an incoming status message from each of the at least some CCF servers in conjunction with operation of the plurality of CCF servers in a charging system, the charging system including the plurality of CCF servers for processing ACRs from one or more network elements of a service provider network during one or more communication sessions via the service provider network, each incoming status message at least including an identifier for the corresponding CCF server from which the incoming status message was broadcast, at least a most recent load status for the corresponding CCF server, and a timestamp associated with the incoming status message; and a status message parsing module for updating the load status and timestamp fields in the load information record associated with each CCF server for which incoming status messages were received by the charging system communication module to store at least the most recent load status and timestamp values from the incoming status message in the corresponding load information record, the load information records being accessible for selecting at least one alternate CCF server after the first CCF server determines it is too busy to process some ACR from some network element.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 2 is an exemplary table showing load information records for alternate CCFs in an exemplary scenario in which one alternate CCF has a normal status and all other alternate CCFs have an overload status;

FIG. 3 is another exemplary table showing load information records for alternate CCFs in an exemplary scenario in which multiple alternate CCFs have a normal status;

DETAILED DESCRIPTION

Figure 1:
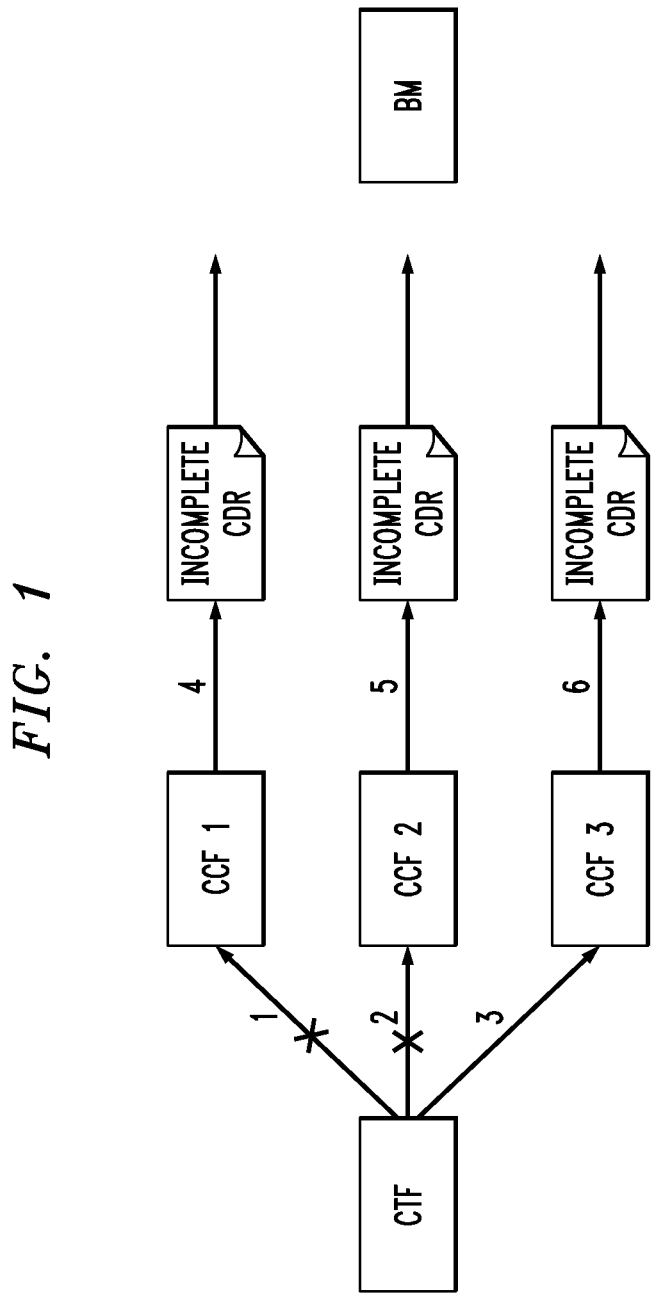
FIG. 1 is a block diagram of an existing charging system depicting overflow conditions in multiple CCFs.

Various embodiments of methods and charging systems that extend or enhance the Diameter Base Protocol (i.e., RFC 3588) by providing a redirection directive to a CTF on an overload condition at a CCF are disclosed herein. The redirection directive may include providing a hint to the CTF for an alternate peer CCF. The hint may identify an address for the alternate peer CCF. The hint can be used to avoid 2 and 5 of FIG. 1. Besides avoiding the additional processing required on CCF2 in creating an Incomplete CDR, the additional transmission of this Incomplete CDR to the BM can be avoided and the subsequent processing at the BM to merge Incomplete CDRs can be reduced.

In one exemplary embodiment, a method of providing a redirection directive on an overload condition at a CCF may include: a) establishing a load baseline for a given charging system node that provides CCF functionality, b) monitoring a current load at individual CCF servers, c) broadcasting load information across deployed CCF servers from each individual CCF server, and d) establishing a redirection directive for an overload condition.

As for establishing a load baseline, the load characteristics of a given type of hardware and CCF load is determined during load testing of the service for a given release. This is typically done in a development lab. Overload thresholds and tolerances for CCFs are established from the load testing. Typically, the CCF is a CPU-intensive application with the CPU utilization percentage providing a key measurement as to the load on each CCF server. In addition to the CPU utilization percentage, implementations may also consider several other indices for monitoring or thresholding. These include memory utilization, internal buffer utilization, database (DB) fill factor, and, in case of deployments that use ACR messages that are extraordinarily large, the input/output (I/O) bandwidth considerations can also be made. For each of the key indices, a few baseline points may be established for the CCF. For example, normal baseline points for normal operating range, peer overload threshold, and peer overload tolerance may be established.

The normal operating range is the safe zone for operation of the CCF servers. A CCF server can have multiple monitored indices that provide this range. For example, a CPU utilization of up to 50% may be considered a safe operating limit. Similarly, a memory utilization of up to 60% may be considered a safe operating limit. If a CCF server experiences a load or condition that exceeds either one (or both) of these safe operating limits, it may be experiencing a peer overload.

A peer overload may be identified by the peer overload threshold and may be characterized by the CCF being in an operational load status (i.e., moderate overload condition) during which it is typically already at least rejecting ANY ACR received on the Rf reference point that pertains to a NEW IMS session. Under this moderate overload condition, the CCF responds to new accounting sessions with an ACA (Overload), but continues to process ACRs for ongoing accounting sessions via normal ACA responses. Generally, this practice helps the CCF load stabilize within certain engineering limits by eventually returning to the normal operating range as ongoing IMS sessions are completed before reaching a severe overload condition. However, this moderate overload condition for operations in a CCF renders it a poor choice for an alternate peer when another CCF rejects an ACR. Thus, this moderate overload condition for operations generally establishes a peer overload condition with respect to failover operations because it is beneficial to avoid having a CCF currently experiencing a moderate overload condition as an alternate peer for failover operations. The criteria for the peer overload condition in a given CCF may follow criteria for the moderate overload condition in the CCF or it may be offset or adjusted in any suitable manner.

A severe overload condition is another operational load status that is identified by a higher overload threshold than the moderate overload. Under a severe overload condition, the CCF rejects ALL accounting messages from ONGOING IMS sessions as well as NEW IMS sessions. Generally, this practice brings the load on the CCF server down to within certain engineered limits. The criteria for the peer overload condition is based on the lower, moderate overload condition, and typically is not associated with the severe overload condition or its higher thresholds.

The peer overload thresholds can be simple utilization percentages associated with a monitored index or can be a composite value which is determined from multiple indices. For example, the peer overload threshold can be reached when CPU utilization is greater than 50%, internal buffer utilization is greater than 40%, or DB fill factor is greater than 75%. The peer overload threshold can also be reached for composite values, such as when CPU utilization is greater than 40% and internal buffer utilization is greater than 35% or when DB fill factor is greater than 65% or memory utilization is greater than 50%. Similarly, the peer overload tolerance may be set up on the CCF server as a simple or composite calculation that is indicative of a hysteresis range for which the peer overload condition is maintained after the peer overload condition is reached even though the CCF is operating below the peer overload threshold value. The hysteresis range established by the peer overload tolerance creates portion at the upper end of the normal operating range when the new load status is based on current load status. In other words, if the CCF is operating in the hysteresis range and the current load status is a normal condition it remains normal until the peer overload threshold is exceeded. Conversely, if the CCF is operating in the hysteresis range and the current load status is a peer overload condition it remains in overload until the load is below the peer overload tolerance.

As for monitoring a current load, each CCF server may be responsible for monitoring the key indices on the server. For example, on a Sun Solaris-based platform, a 'prstat' command can provide the CPU utilization. A prstat "output" command may receive the following information:

| PARAMETER | VALUE |
|---|---|
| PID | 22583 |
| USERNAME | spa |
| SIZE | 23G |
| RSS | 23G |
| STATE | sleep |
| PRI | 59 |
| NICE | −8 |
| TIME | 132:06:39 |
| CPU | 40% |
| PROCESS/NLWP | CCFrsa/140 |

In addition, it is typical for each platform to have measurements available at specific frequencies for reporting purposes. Such measurements are periodically fed to a central element management system (EMS).

The key indices selected for the baseline must be available for monitoring. Different implementations may use different schemes, but it is considered a safe approach to put the CPU utilization as a bottleneck for the CCF performance. Thus, even in the absence of additional measurements on a platform, an OS-supported command that measures CPU utilization at any given time suffices for the monitoring of the key index that determines if the CCF server is within the safe operating zone or experiencing any kind of peer overload condition. The measurements are taken periodically and it is generally a balance between the available time tolerance for reporting overload versus additional load on the CCF server to take the frequent snapshot value of the index or indices. For example, a 30 second frequency may be implemented. Longer or shorter intervals are also contemplated. Any suitable interval may be implemented.

As for broadcasting load information, each CCF server broadcasts to all other CCF servers in the network about its current load condition cyclically. Given that for a vast majority of time the CCF servers are expected to 'behave nicely' and work within the engineered limits, this implementation provides an optimized update behavior. For this, the load situation at the CCF is considered and is categorized as follows: i) a first category for CCF servers that are experiencing load which is a provisioned tolerance percentage less than the lower threshold limit; ii) a second category for CCF servers that are experiencing overload conditions at the peer overload threshold value and higher; and iii) a third category for CCF servers that are experiencing load conditions within the hysteresis range between the peer overload tolerance value and the peer overload threshold value when the current load status is a peer overload condition.

For CCF server broadcasts of load conditions in the first category, the CCF servers send an "I am alive" message (i.e., normal load status) including the time stamp of the message sending and a measure of one or more load characteristics showing that the load situation is well under control. For example, if the peer overload threshold is set to 55% CPU utilization and the tolerance percentage is set to 5%, if a CCF CPU utilization is roughly 50% or less, the said CCF would send the "I am alive" message containing the timestamp and measures indicating that the load situation is normal. These measurements include the measured index or indices, identification of the node via IP address, timestamp, and a normal load status indication.

For CCF server broadcasts of load conditions in the second category, including CCF servers that are beyond the peer overload threshold, a full set of measurements is not required on the broadcast channel because the CCF is generally considered not available as an alternate peer for failover operations. These measurements include identification of the node via IP address, timestamp, and a peer overload load status indication.

For CCF server broadcasts of load conditions in the third category, the servers send the same type of message as for the first category. These messages containing node identification, measured index or indices, timestamp, and the load status information. The new load status in the current message will reflect a normal condition if the previous load status was normal. Conversely, the new load status will reflect a peer overload condition if the previous load status was overload.

Note that the timestamp in the load condition broadcasts provides a date, month, year, HH, MM, sec, as permitted by the relevant operating system.

With reference to FIG. 2, each server that receives the load information broadcast message, the server updates an internal table maintained locally. As shown, this status table may include node-id, timestamp, status, CPU load, peer overload threshold, and peer overload tolerance for each corresponding CCF broadcast received.

The information in the status table would be identical on all in-service CCF nodes. However, the cyclical status updates are not expected to be done all at the same time. This is an expected behavior, since the network slew and the current load conditions on a CCF may be different among CCF servers.

It is also noted that the CPU Load is considered as the sole index for establishing load criteria among servers, but this is by no means restrictive to only one measurement. For example, a composite index can be built as discussed above.

As for establishing a redirection directive, consider a CCF that is undergoing a moderate or severe overload situation during normal operations which prompts it to reject an ACR from a CTF. Previously, in the normal run, the CCF would simply reject the ACR and cite overload (i.e., too busy to handle) as the cause of rejection in an ACA to the CTF. However, as described herein, the CCF could also include alternate peer information along with the ACA rejecting the request and the indication that the cause for rejection was an overload condition.

With continued reference to FIG. 2, assume CCF2, which is identified by the node-id IP Addr 2, is in a moderate overload condition relating to normal operation and receives a start ACR for a new IMS session. Previously, since CCF2 is currently under the moderate overload condition, the CCF2 would tend to reject the start ACR with an ACA that contains Result-Code 3004 (i.e., DIAMETER_TOO_BUSY). However, as described herein, CCF2 may consult its internal load status table to consider an alternate peer for the request. The two choices are CCF servers indicated by IP Addr 1 (i.e., CCF1) and IP Addr 3 (CCF3). As shown in FIG. 2, CCF1 shows a normal load status and CCF3 shows a peer overload condition relating to the peer overload threshold. Notably, the peer overload condition at CCF3 indicates that CCF3 is experiencing a moderate or severe overload condition with respect to normal operation. The initial preference is for CCF2 to recommend the CCF server denoted by IP Addr 1 (i.e., CCF1) as an alternate peer. To confirm this preference, CCF2 may check the timestamp relating to the CCF1 normal status to determine if the last broadcast status for CCF1 that is recorded in the table is recent or stale. If it is recent, CCF2 may construct the ACA response message to the start ACR from the corresponding CTF with a rejection and an alternate peer suggestion identifying CCF1. An exemplary ACA response message for this scenario includes the following information:

```
<ACA> ::= < Diameter Header: 271, PXY >
          < Session-Id >
          { Result-Code }
          { Origin-Host }
          { Origin-Realm }
          { Accounting-Record-Type }
          { Accounting-Record-Number }
          [ Acct-Application-Id ]
          [ Vendor-Specific-Application-Id ]
          [ User-Name ]
          [ Accounting-Sub-Session-Id ]
```

-continued

```
          [ Acct-Session-Id ]
          [ Acct-Multi-Session-Id ]
          [ Error-Reporting-Host ]
          [ Acct-Interim-Interval ]
          [ Accounting-Realtime-Required ]
          [ Origin-State-Id ]
          [ Event-Timestamp ]
        * [ Proxy-Info ]
        * [ AVP ]
        * [ Alternate-Peer ]
```

For an exemplary CCF moderate or severe overload condition with respect to normal operations, the Result-Code in the corresponding ACA response message would be 3004 (i.e., DIAMETER_TOO_BUSY). In addition, the ACA response message from the CCF experiencing the overload condition may include zero, one, or more Alternate-Peer suggestions for use by the corresponding CTF in the subsequent failover operation. The ACA syntax is includes an Alternate-Peer AVP. Note that the Alternate-Peer AVP is an optional multiple-occurrence AVP. The "optional" characteristic is indicated by '[ . . . ]' in the syntax above and the "multi-occurrence" characteristic is indicated by '*' in the syntax above. The Alternate-Peer AVP may be a derived data type from 'OctetString' and may be of type 'Address', which can be used to carry IPv4 or IPv6 address.

Thus, where the load status of a CCF is normal with respect to normal operations, the ACA response message to ACRs from CTFs would not include the Alternate-Peer AVP. Conversely, for CCF overload conditions with respect to normal operations, the ACA response message to ACRs from CTFs may include zero, one, or more Alternate-Peer AVPs identifying an alternate peer, for example, by its corresponding IP address for use by the corresponding CTF in the subsequent failover operation.

With reference to FIG. 3, an exemplary CCF peer overload condition is depicted for purposes of explaining resolution of a "tie" where the current status of two or more alternate peers is the same or otherwise indistinguishable. As shown, assume CCF2, the server indicated by IP Addr 2, is experiencing a moderate or severe overload condition and must refuse ACRs. In rejecting the ACR messages, CCF2 finds that both of the other CCF servers (i.e., CCF1 and CCF3) are in the normal operating condition. Therefore, CCF2 has several implementation options regarding the ACA response message. In a first exemplary option, a technique to randomly select a CCF server as the alternate peer for the ACA response message from the CCF servers having the same load status. In another exemplary option, a round-robin technique can be used to select the CCF server that will be recommended as the alternate peer in the ACA response message. In an alternate exemplary option, the CCF server that is least loaded, as judged by its relative load index, can be selected as the alternate peer in the ACA response message. In yet another exemplary option, multiple CCF servers can be selected as alternate peers for the ACA response message. In this technique, the multiple alternate peers can be presented in an ordered (i.e., prioritized) fashion or in an unordered fashion. The multiple alternate peer option is particularly useful if the NE (i.e., CTF) has any local policy that it follows in selecting the CCF to which accounting information is to be sent, such as a distinction between a pool of CCF servers identified via a primary fully qualified domain name (FQDN) versus a secondary FQDN.

The multiple alternate peers can be selected and prioritized using any suitable status criteria, a random order, a round-robin order, or any suitable prioritizing technique. For example, the prioritized list of CCF servers can be established and prioritized based on any suitable combination the following status criteria: i) CCF server availability (i.e., based on how recent the timestamp is for load status information for the CCF servers), ii) the current load status (e.g., relative load indices on these servers, while excluding those which are overloaded), iii) and a relative load. As for consideration of the relative load, when more than one CCF server has a normal load status, the CPU load at the corresponding CCF servers can be examined. Additionally, the first and the second thresholds for each CCF server can be considered. Here, it is noted that, within a given billing system, the peer overload threshold and peer overload tolerance are expected to be similar across the CCF servers. However, the dissimilar CCF server types can be implemented in the same billing system as well, which makes the thresholds instrumental in the decision-making.

For CCF server status information that only indicates that load status is normal without any additional status criteria, a random selection of the CCF server for the alternate peer or a round-robin selection would suffice. Since each billing system deployment comes with its own policies, all options can be presented to the operator for selection.

The disclosed various embodiments of methods and charging systems herein replace the blind search methodology currently followed in the standards. Moreover, the various embodiments of methods and charging systems reduce the processing needs on the front-end (i.e., ACR reception), middle-tier (i.e., local processing on the CCF), and the back-end (i.e., reconciliation and merging of incomplete CDRs at the billing mediation).

Previous solutions just turn away ACR requests. The solutions provided herein give the corresponding CTF a hint or indication of an alternate peer CCF server which may be able to process the ACR request. The process for suggesting the alternate peer CCF server confirms that the CCF server is in-service and has sufficient processing capacity to handle the ACR request.

Figure 4:
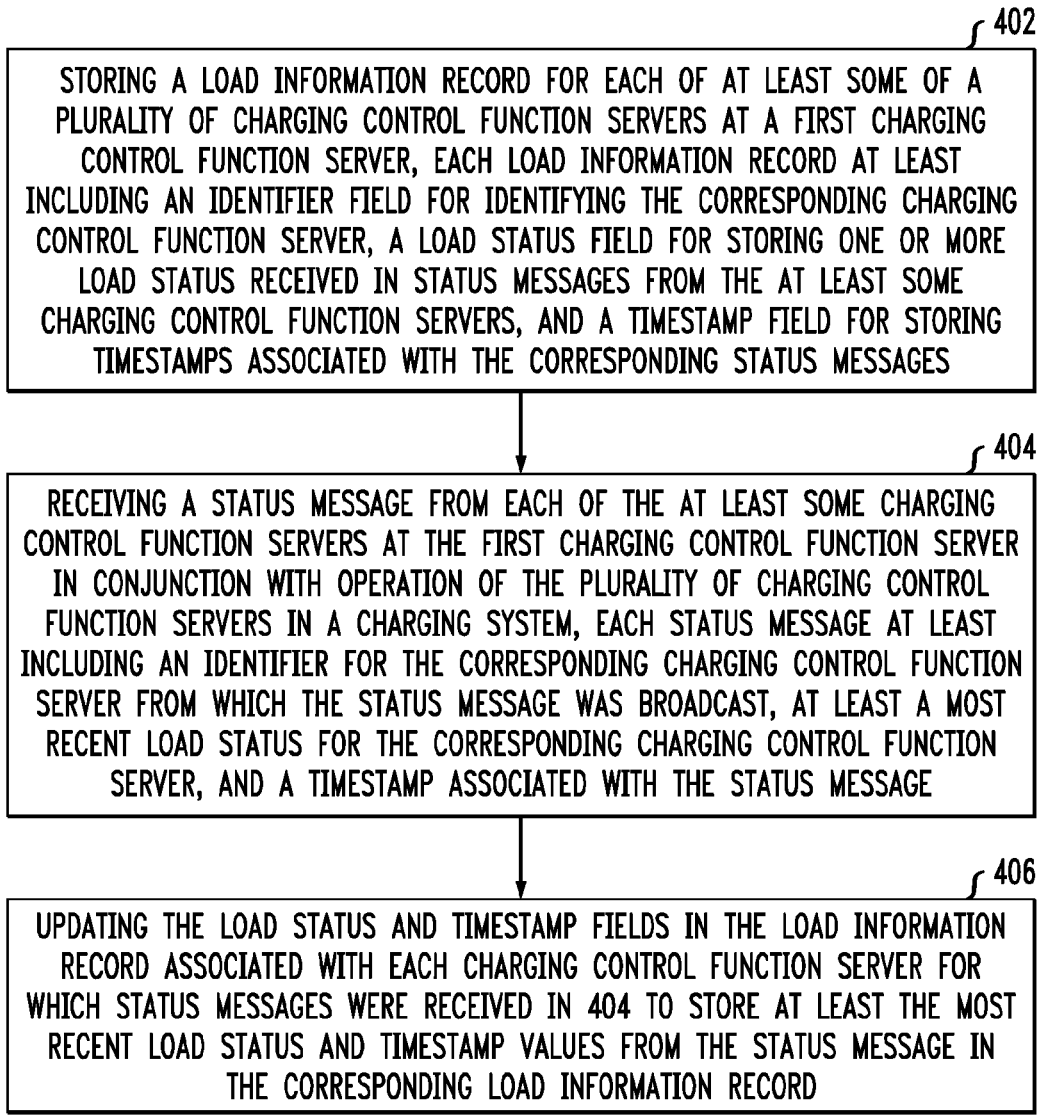
FIG. 4 is a flow chart of an exemplary embodiment of a process for using a charging system to account for service provided by a network element in a service provider network.

Referring again to the drawings wherein the showings are for purposes of illustrating the exemplary embodiments only and not for purposes of limiting the claimed subject matter, FIG. 4 depicts an exemplary embodiment of a process 400 for using a charging system to account for service provided by a network element in a service provider network begins at 402 where a load information record for each of at least some of a plurality of CCF servers is stored at a first CCF server. Each load information record may include an identifier field, a load status field, and a timestamp field. The identifier field for identifying the corresponding CCF server. The load status field for storing one or more load status received in status messages from the at least some CCF servers. The timestamp field for storing timestamps associated with the corresponding status messages.

Next, a status message is received from each of the at least some CCF servers at the first CCF server in conjunction with operation of the plurality of CCF servers in a charging system (404). The charging system may include the plurality of CCF servers for processing ACRs from one or more network elements of a service provider network during one or more communication sessions via the service provider network. Each status message may include an identifier for the corresponding CCF server from which the status message was broadcast, at least a most recent load status for the corresponding CCF server, and a timestamp associated with the status message.

At 406, the load status and timestamp fields are updated in the load information record associated with each CCF server for which status messages were received in 404 to store at least the most recent load status and timestamp values from the status message in the corresponding load information record. The load information records being accessible to the first CCF server for selecting at least one alternate CCF server after the first CCF server determines it is too busy to process some ACR from some network element. It is understood that 404 and 406 are performed for each status message received from the at least some CCF servers. Thus, 404 and 406 are generally performed in a cyclical manner as status messages are received from each of the at least one CCF server. Nevertheless, with respect to different CCF servers, 404 and 406 may be performed in parallel or any suitable timing arrangement. It is also understood that 404 and 406 are performed in a cyclical manner as multiple status messages are received from the same CCF servers, In another embodiment of the process 400, the load information records and constituent fields are arranged in a peer characteristics table in the first CCF server.

In yet another embodiment of the process 400, each load information record also includes a load characteristic field for each load characteristic monitored by the at least some CCF servers. In this embodiment, each status message also includes an actual value for each load characteristic monitored by the corresponding CCF server. The load characteristic fields in the load information records for storing at least most recent corresponding actual values received in status messages from the corresponding CCF servers.

In still another embodiment of the process 400, the status message in 404 includes the identifier, the most recent load status, at least a most recent actual value for at least one load characteristic monitored by the corresponding CCF server from which the status message was received, and the timestamp when the load status in the corresponding status message is a normal condition. When the load status in the corresponding status message is a peer overload condition, the status message in 404 includes the identifier, the most recent load status, and the timestamp. In a further embodiment, the updating in 406 includes updating the load characteristic fields in the load information records associated with each CCF server for which status messages received in 404 included corresponding actual values.

In still yet another embodiment of the process 400, the receiving in 404 and the updating in 406 are repeated during operation of the first CCF server in relation to corresponding CCF servers of the at least some CCF servers periodically broadcasting status messages. CCF servers may broadcast periodic status messages at the same frequency or different frequencies. Periodic status messages from different status messages from different CCFs may be received at different times even if they are broadcast in some synchronized fashion due to inherent characteristics of the transmission medium and the distance between the broadcasting and receiving CCFs.

In another embodiment of the process 400, the receiving in 404 and the updating in 406 are repeated during operation of the first CCF server in response to corresponding CCF servers of the at least some CCF servers broadcasting status messages at least each time there is a change in load status for the corresponding CCF server. In this embodiment, the timestamp is not an accurate indicator of the whether or not the status message is more or less accurate because an aged status message may be valid or may be the result of the corresponding CCF going out of service.

Figure 5:
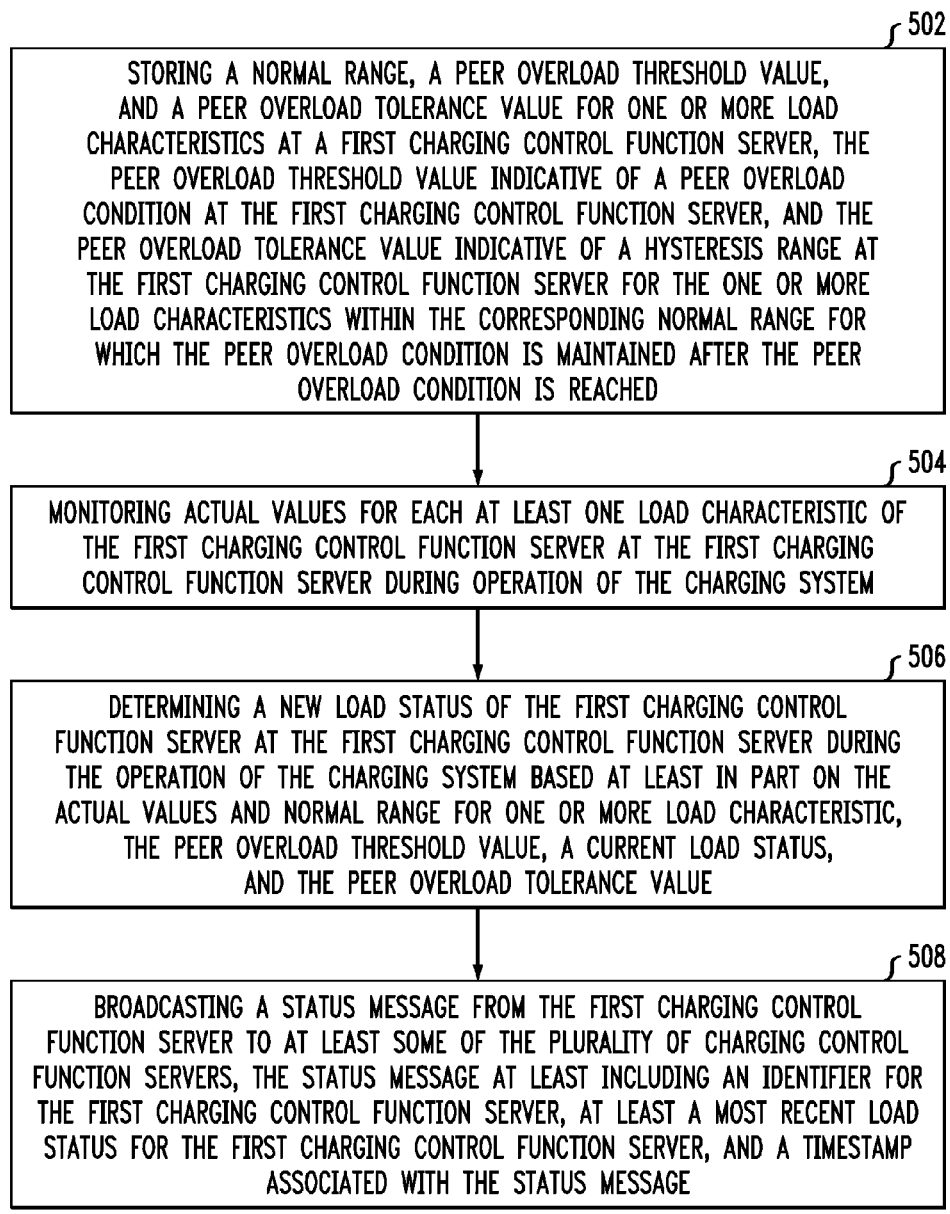
FIG. 5 is a flow chart of another exemplary embodiment of a process for using a charging system to account for service provided by a network element in a service provider network.

With reference to FIG. 5, another exemplary embodiment of a process 500 for using a charging system to account for service provided by a network element in a service provider network begins at 502 where a normal range, a peer overload threshold value, and a peer overload tolerance value for one or more load characteristics are stored at a first CCF server. The one or more load characteristics associated with operation of the first CCF server in conjunction with operation of a charging system. The charging system including a plurality of CCF servers for processing ACRs from one or more network elements of a service provider network during one or more communication sessions via the service provider network. The peer overload threshold value indicative of a peer overload condition at the first CCF server. The peer overload tolerance value indicative of a hysteresis range at the first CCF server for the one or more load characteristics within the corresponding normal range for which the peer overload condition is maintained after the peer overload condition is reached. The one or more load characteristics may include one load characteristic, each of multiple load characteristics, or a composite load characteristic in any suitable combination.

Next, actual values for each at least one load characteristic of the first CCF server are monitored at the first CCF server during operation of the charging system (504). At 506, a new load status of the first CCF server is determined at the first CCF server during the operation of the charging system based at least in part on the actual values and normal range for the one or more load characteristics, the peer overload threshold value, a current load status, and the peer overload tolerance value. Next, a status message is broadcast from the first CCF server to at least some of the plurality of CCF servers (508). The status message at least including an identifier for the first CCF server, at least a most recent load status for the first CCF server, and a timestamp associated with the status message.

In another embodiment of the process 500, the at least one load characteristic includes a CPU utilization parameter, a memory utilization parameter, an internal buffer utilization parameter, a link usage parameter, a database utilization parameter, or any combination thereof.

In yet another embodiment of the process 500, the determining in 506 includes i) determining the new load status is a normal condition when the current load status is normal and the first CCF server is operating below the first threshold value, ii) determining the new load status is the peer overload condition when the first CCF server is operating at the first threshold value and higher, and iii) determining the new load status is the peer overload condition when the current load status is the peer overload condition and the first CCF server is operating below the peer overload threshold value, but within the hysteresis range established by the peer overload tolerance value. In a further embodiment, the status message in 508 includes the identifier, the most recent load status, at least a most recent actual value for each load characteristic monitored in 504, and the timestamp when the normal condition is the new load status determined in 506. When the peer overload condition is the new load status determined in 506, the status message in 508 includes the identifier, the most recent load status, and the timestamp.

In still another embodiment of the process 500, the monitoring in 504 and the determining in 506 are performed periodically during operation of the first CCF. In a further embodiment, the broadcasting in 508 is performed at least each time there is a change in load status for the first CCF.

In still yet another embodiment of the process 500, the broadcasting in 508 is performed periodically during operation of the first CCF.

Figure 6:
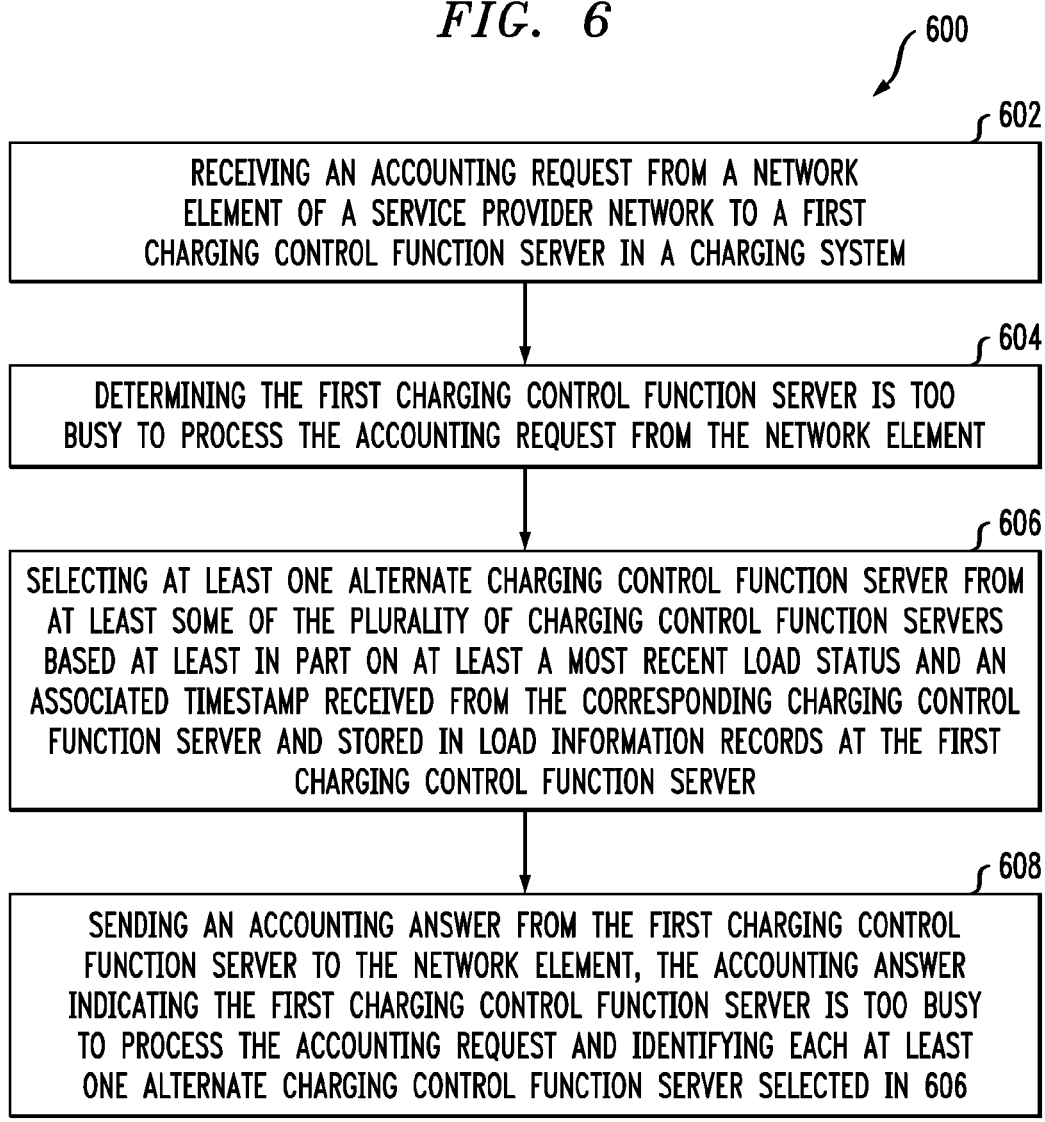
FIG. 6 is a flow chart of yet another exemplary embodiment of a process for using a charging system to account for service provided by a network element in a service provider network.

With reference to FIG. 6, yet another exemplary embodiment of a process 600 for using a charging system to account for service provided by a network element in a service provider network begins at 602 where an ACR from a network element of a service provider network is received at a first CCF server in a charging system. The ACR associated with service provided by the network element in a service provider network in conjunction with a communication session. The charging system including a plurality of CCF servers for processing ACRs from one or more network elements of the service provider network during one or more communication sessions via the service provider network.

Next, the first CCF server determines it is too busy to process the ACR from the network element (604). At 606, at least one alternate CCF server is selected from at least some of the plurality of CCF servers based at least in part on at least a most recent load status and an associated timestamp received from the corresponding CCF server and stored in load information records at the first CCF server. Next, an ACA is sent from the first CCF server to the network element (608). The ACA indicating the first CCF server is too busy to process the ACR and identifying each at least one alternate CCF server selected in 606.

In another embodiment of the process 600, the determining in 604 includes determining the first CCF server is too busy to process the ACR when a current load status for the first CCF server is at a first threshold value indicative of a moderate overload condition and higher if the ACR received in 602 is a start accounting record for a new communication session in the service provider network. Otherwise, the determining in 604 includes determining the first CCF server is too busy to process the ACR when the current load status for the first CCF server is at a second threshold value indicative of a severe overload condition and higher.

In still another embodiment of the process 600, at least one load characteristic is received from the at least some CCF servers along with the most recent load status and associated timestamp. In this embodiment, the at least one load characteristic is stored in the corresponding load information records at the first CCF server. In the embodiment being described, if the load information records show that multiple alternate CCF servers are at the normal condition and corresponding associated timestamps are within the predetermined age threshold from the current date and time, the process 600 also includes selecting the corresponding alternate CCF server with a lowest normal load condition from the multiple alternate CCF servers based at least in part on the at least one load characteristic in the load information records.

In yet another embodiment of the process 600, the selecting in 606 includes selecting the corresponding alternate CCF server at the normal condition if the load information records show that only one alternate CCF server is at a normal condition and the associated timestamp is within a predetermined age threshold from a current date and time. Otherwise, if the load information records show that multiple alternate CCF servers are at the normal condition and any of the associated timestamps are within the predetermined age threshold from the current date and time, the selecting in 606 includes selecting the corresponding alternate CCF server with the associated timestamp that is closest to the current date and time from the multiple alternate CCF servers.

In still another embodiment of the process 600, the selecting in 606 includes randomly selecting one of the multiple alternate CCF servers at the normal condition that are associated with timestamps within the predetermined age threshold from the current date and time if the load information records show that multiple alternate CCF servers are at a normal condition and more than one of the associated timestamps are within a predetermined age threshold from a current date and time.

In still yet another embodiment of the process 600, the selecting in 606 includes selecting one of the multiple alternate CCF servers at the normal condition that are associated with timestamps within the predetermined age threshold from the current date and time in a round-robin fashion if the load information records show that multiple alternate CCF servers are at a normal condition and more than one of the associated timestamps are within a predetermined age threshold from a current date and time.

In another embodiment of the process 600, the selecting in 606 includes selecting all of the multiple alternate CCF servers at the normal condition that are associated with timestamps within the predetermined age threshold from the current date and time if the load information records show that multiple alternate CCF servers are at a normal condition and more than one of the associated timestamps are within a predetermined age threshold from a current date and time. In a further embodiment, at least one load characteristic is received from the at least some CCF servers along with the most recent load status and associated timestamp. In this embodiment, the at least one load characteristic is stored in the corresponding load information records at the first CCF server along with the most recent load status and associated timestamp. In the embodiment being described, the alternate CCF servers selected in 606 are prioritized based at least in part on the at least one load characteristic stored in the load information records.

In another embodiment of the process 600, the ACA sent in 608 includes an alternate-peer attribute-variable pair for each alternate CCF server selected in 606. Each alternate-peer attribute-variable pair identifying the corresponding alternate CCF server.

Figure 7:
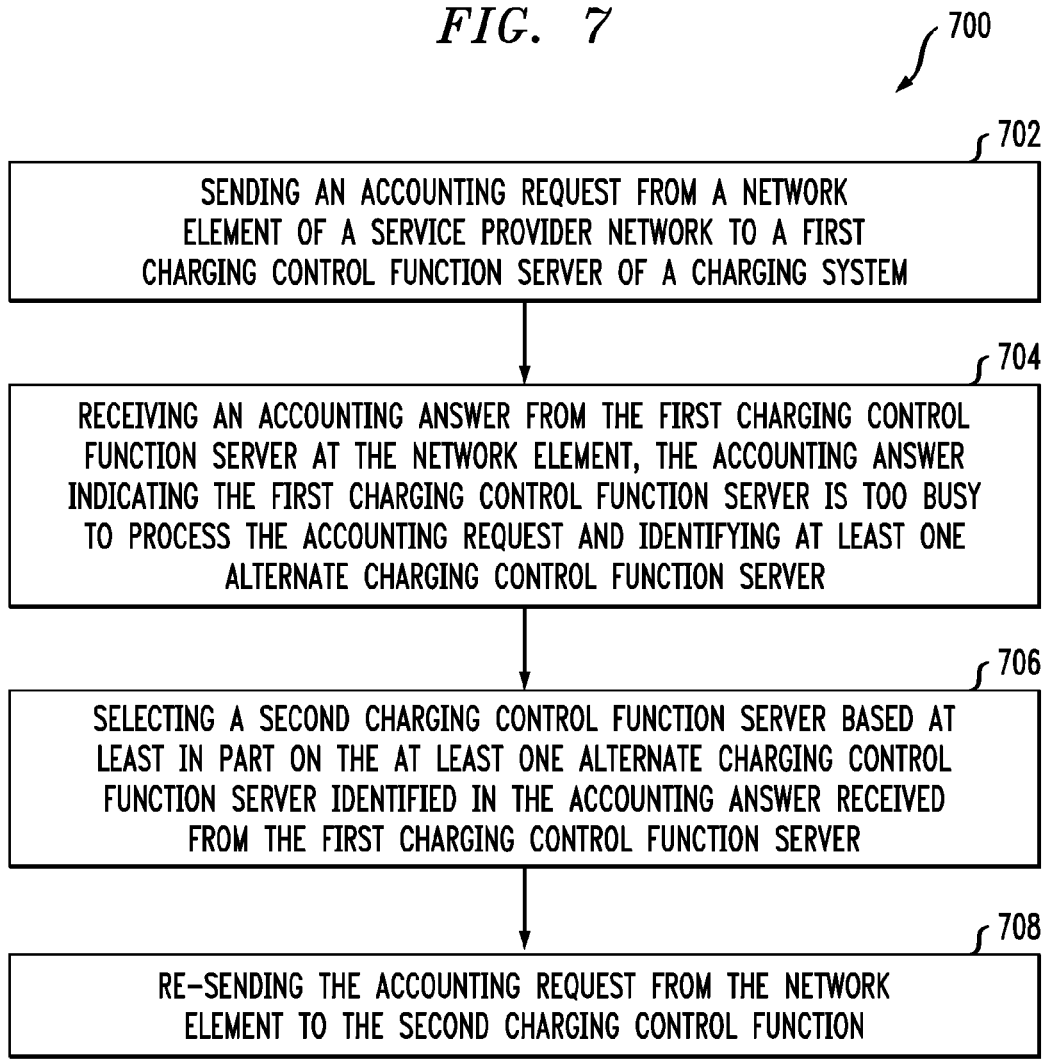
FIG. 7 is a flow chart of still another exemplary embodiment of a process for using a charging system to account for service provided by a network element in a service provider network.

With reference to FIG. 7, still another exemplary embodiment of a process 700 for using a charging system to account for service provided by a network element in a service provider network begins at 702 where an ACR is sent from a network element of a service provider network to a first CCF server of a charging system. The ACR associated with service provided by the network element in a service provider network in conjunction with a communication session. The charging system including a plurality of CCF servers for processing ACRs from one or more network elements of the service provider network during one or more communication sessions via the service provider network.

Next, an ACA is received from the first CCF server at the network element, the ACA indicating the first CCF server is too busy to process the ACR and identifying at least one alternate CCF server (704). At 706, a second CCF server is selected based at least in part on the at least one alternate CCF server identified in the ACA received from the first CCF server. Next, the ACR is re-sent from the network element to the second CCF (708).

In another embodiment of the process 700, the ACA received in 704 includes an alternate-peer attribute-variable pair for each at least one alternate CCF server. Each alternate-peer attribute-variable pair identifying the corresponding alternate CCF server.

Figure 8:
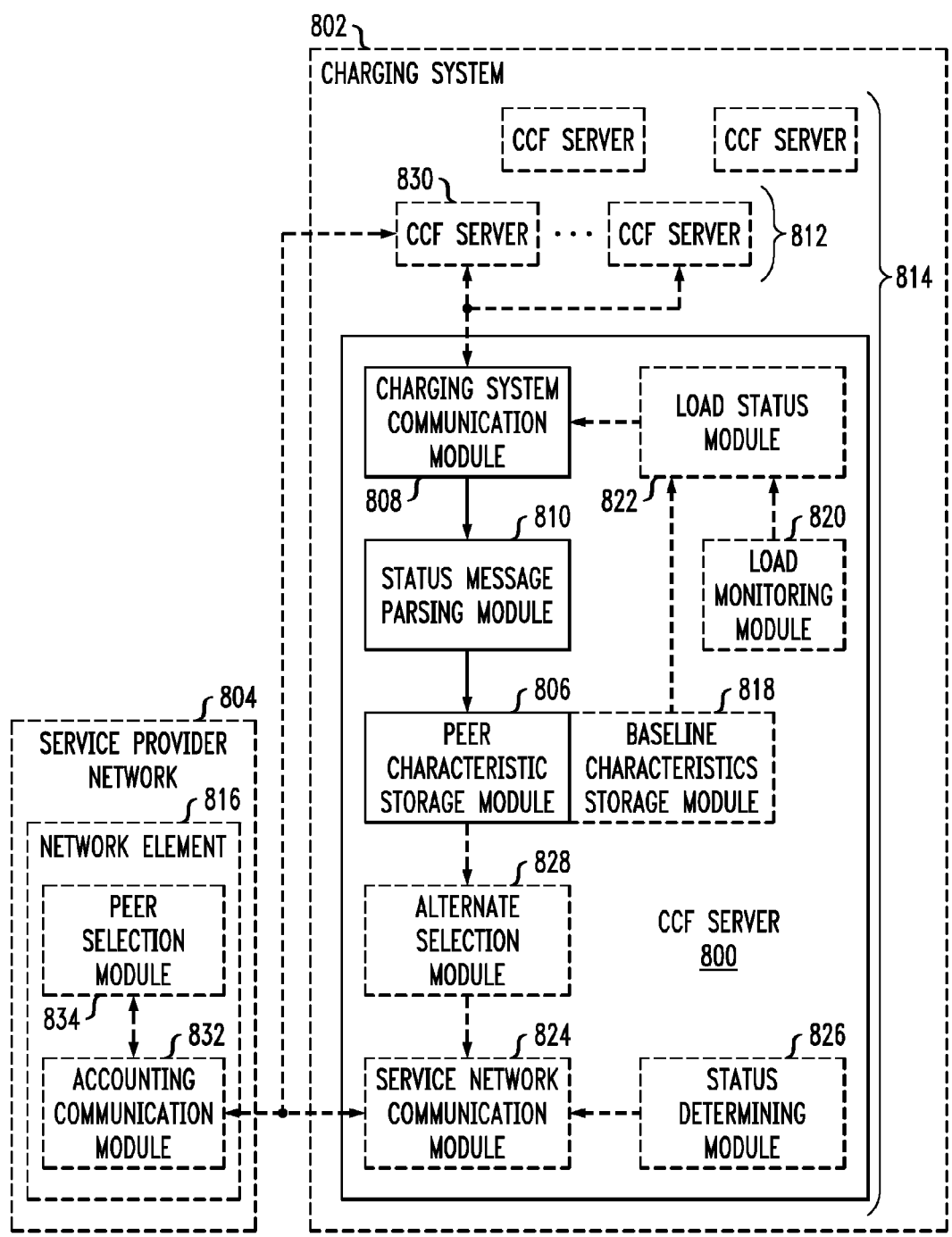
FIG. 8 is a block diagram of an exemplary embodiment of a CCF server within a charging system that accounts for service provided by network elements of a service provider network.

With reference to FIG. 8, an exemplary embodiment of a CCF server 800 within a charging system 802 that accounts for service provided by network elements of a service provider network 804 includes a peer characteristics storage module 806, a charging system communication module 808, and a status message parsing module 810. The peer characteristics storage module 806 for storing a load information record for each of at least some 812 of a plurality of CCF servers 814. Each load information record at least including an identifier field for identifying the corresponding CCF server, a load status field for storing one or more load status received in incoming status messages from the at least some CCF servers, and a timestamp field for storing timestamps associated with the corresponding incoming status messages.

The charging system communication module 808 for receiving an incoming status message from each of the at least some CCF servers 812 in conjunction with operation of the plurality of CCF servers 814 in a charging system 802. The charging system 802 including the plurality of CCF servers 814 for processing ACRs from one or more network elements of a service provider network 804 during one or more communication sessions via the service provider network 804. Each incoming status message at least including an identifier for the corresponding CCF server from which the incoming status message was broadcast, at least a most recent load status for the corresponding CCF server, and a timestamp associated with the incoming status message.

The status message parsing module 810 for updating the load status and timestamp fields in the load information record associated with each CCF server for which incoming status messages were received by the charging system communication module to store at least the most recent load status and timestamp values from the incoming status message in the corresponding load information record. The load information records being accessible for selecting at least one alternate CCF server after the first CCF server 800 determines it is too busy to process some ACR from some network element 816.

In another embodiment, the first CCF server 800 may also include a baseline characteristics storage module 818, a load monitoring module 820, and a load status module 822. The baseline characteristics storage module 818 for storing a normal range, a peer overload threshold value, and a peer overload tolerance value for one or more load characteristics. The one or more load characteristics associated with operation of the first CCF server 800 in conjunction with operation of the charging system 802. The peer overload threshold value indicative of a peer overload condition at the first CCF server 800. The peer overload tolerance value indicative of a hysteresis range at the first CCF server 800 for the one or more load characteristics within the corresponding normal range for which the peer overload condition is maintained after the peer overload condition is reached. The load monitoring module 820 for monitoring actual values for each at least one load characteristic of the first CCF server 800 during operation of the charging system 802. The load status module 822 for determining a new load status of the first CCF server 800 during the operation of the charging system 802 based at least in part on the actual values and normal range for each at least one load characteristic, the peer overload threshold value, and the peer overload tolerance value. In this embodiment, the charging system communication module 808 is also for broadcasting an outgoing status message to at least some 812 of the plurality of CCF servers 814. The outgoing status message at least including an identifier for the first CCF server, at least a most recent load status for the first CCF server, and a timestamp associated with the outgoing status message.

In another embodiment, the first CCF server 800 may also include a service network communication module 824, a status determining module 826, and an alternate selection module 828. The service network communication module 824 for receiving an ACR from a network element 816 of the service provider network 804 to the first CCF server 800. The ACR associated with service provided by the network element 816 in the service provider network 804 in conjunction with a communication session. The status determining module 826 for determining the first CCF server 800 is too busy to process the ACR from the network element 816. The alternate selection module 828 for selecting at least one alternate CCF server 830 from at least some 812 of the plurality of CCF servers 814 based at least in part on at least a most recent load status and an associated timestamp received from the corresponding CCF server and stored in load information records of the peer characteristics storage module 806. In this embodiment, the service network communication module 824 is also for sending an ACA from the first CCF server 800 to the network element 816. The ACA indicating the first CCF server 800 is too busy to process the ACR and identifying each at least one alternate CCF server 830 selected by the alternate selection module 828.

In yet another embodiment, the first CCF server 800 includes a charging data function (CDF) server at an input stage of the first CCF server 800. The CDF server comprising the peer characteristics storage module 806, the charging system communication module 808, the status message parsing module 806, the service network communication module 824, the status determining module 826, and the alternate selection module 828.

In still another embodiment, the network element 816 of the service provider network 804 includes an accounting communication module 832 and a peer selection module 834. The accounting communication module 832 for sending the ACR to the first CCF server 800. In this embodiment, the accounting communication module 832 is also for receiving the ACA from the first CCF server 800. The peer selection module 834 for selecting a second CCF server 830 based at least in part on the at least one alternate CCF server 830 identified in the ACA received from the first CCF server 800. In this embodiment, the accounting communication module 832 is also for re-sending the ACR to the second CCF 830.

In still another embodiment, the first CCF server 800 and the at least some CCF servers 812 form a first cluster of CCF servers associated with a first fully qualified domain name. The charging system 802 including at least one other cluster of CCF servers associated with a different fully qualified domain name.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A method for using a charging system to account for service provided by a network element in a communication network, comprising:
    receiving a request from a network element of a communication network at a first charging control function server in a charging system, the request associated with service provided by the network element in conjunction with a communication session, the charging system including a plurality of charging control function servers for processing requests from one or more network elements of the communication network during one or more communication sessions via the communication network;
    determining the first charging control function server is too busy to process the request from the network element;
    selecting at least one alternate charging control function server from at least some of the plurality of charging control function servers based at least on a most recent load status and associated time information received from the corresponding charging control function server and stored in load information records at the first charging control function server; and
    sending an answer from the first charging control function server to the network element, the answer indicating the first charging control function server is too busy to process the request and identifying each alternate charging control function server selected.

2. The method set forth in claim 1, the determining the first charging control function server is too busy further comprising:
    if the request received from the network element is a start record for a new communication session in the communication network, determining the first charging control function server is too busy to process the request when a current load status for the first charging control function server is at a first threshold value indicative of a moderate overload condition and higher; and
    determining the first charging control function server is too busy to process the request when the current load status for the first charging control function server is at a second threshold value indicative of a severe overload condition and higher.

3. The method set forth in claim 1 wherein at least one load characteristic is received from the at least some charging control function servers along with the most recent load status and associated time information, wherein the at least one load characteristic is stored in the corresponding load information records at the first charging control function server, the selecting of the at least one alternate charging control function server further comprising:
    if the load information records show that multiple alternate charging control function servers are at the normal condition and the corresponding associated time information is within the predetermined age threshold from the current date and time, selecting the corresponding alternate charging control function server with a lowest normal load condition from the multiple alternate charging control function servers based at least on the at least one load characteristic in the load information records.

4. The method set forth in claim 1, the selecting of the at least one alternate charging control function server further comprising:
    if the load information records show that only one alternate charging control function server is at a normal condition and the associated time information is within a predetermined age threshold from a current date and time, selecting the corresponding alternate charging control function server at the normal condition; and
    if the load information records show that multiple alternate charging control function servers are at the normal condition and any of the associated time information is within the predetermined age threshold from the current date and time, selecting the corresponding alternate charging control function server with the associated time information that is closest to the current date and time from the multiple alternate charging control function servers.

5. The method set forth in claim 1, the selecting of the at least one alternate charging control function server further comprising:
    if the load information records show that multiple alternate charging control function servers are at a normal condition and more than one of the associated time information is within a predetermined age threshold from a current date and time, randomly selecting one of the multiple alternate charging control function servers at the normal condition that are associated with time information within the predetermined age threshold from the current date and time.

6. The method set forth in claim 1, the selecting of the at least one alternate charging control function server further comprising:
if the load information records show that multiple alternate charging control function servers are at a normal condition and more than one of the associated time information is within a predetermined age threshold from a current date and time, selecting one of the multiple alternate charging control function servers at the normal condition that are associated with time information within the predetermined age threshold from the current date and time in a round-robin fashion.

7. The method set forth in claim 1, the selecting of the at least one alternate charging control function server further comprising:
if the load information records show that multiple alternate charging control function servers are at a normal condition and more than one of the associated time information is within a predetermined age threshold from a current date and time, selecting all of the multiple alternate charging control function servers at the normal condition that are associated with time information within the predetermined age threshold from the current date and time.

8. The method set forth in claim 7 wherein at least one load characteristic is received from the at least some charging control function servers along with the most recent load status and associated time information, wherein the at least one load characteristic is stored in the corresponding load information records at the first charging control function server along with the most recent load status and associated time information, and wherein the alternate charging control function servers selected are prioritized based at least on the at least one load characteristic stored in the load information records.

9. The method set forth in claim 1 wherein the answer sent to the network element includes an alternate-peer attribute-variable pair for each alternate charging control function server selected, each alternate-peer attribute-variable pair identifying the corresponding alternate charging control function server.

10. An apparatus for providing a charging control function in a charging system, comprising:
a peer characteristics storage module configured to store a load information record for each of at least some of a plurality of charging control function servers, each load information record at least including an identifier field for identifying the corresponding charging control function server, a load status field for storing one or more load status received in incoming status messages from the at least some charging control function servers, and a time information field for storing time information associated with the corresponding incoming status messages;
a charging system communication module configured to receive an incoming status message from each of the at least some charging control function servers in conjunction with operation of the plurality of charging control function servers in a charging system, the charging system including the plurality of charging control function servers for processing requests from one or more network elements of a communication network during one or more communication sessions via the communication network, each incoming status message at least including an identifier for the corresponding charging control function server from which the incoming status message was broadcast, at least a most recent load status for the corresponding charging control function server, and time information associated with the incoming status message; and
a status message parsing module configured to update the load status and time information fields in the load information record associated with each charging control function server for which incoming status messages were received by the charging system communication module to store at least the most recent load status and time information values from the incoming status message in the corresponding load information record, the load information records being accessible for selecting at least one alternate charging control function server after the apparatus determines it is too busy to process some request from some network element.

11. The apparatus of claim 10, further comprising:
a baseline characteristics storage module configured to store a normal range, a peer overload threshold value, and a peer overload tolerance value for one or more load characteristics, the one or more load characteristics associated with operation of the apparatus in conjunction with operation of the charging system, the peer overload threshold value indicative of a peer overload condition at the apparatus, and the peer overload tolerance value indicative of a hysteresis range at the apparatus for the one or more load characteristics within the corresponding normal range for which the peer overload condition is maintained after the peer overload condition is reached;
a load monitoring module configured to monitor actual values for each load characteristic of the apparatus during operation of the charging system;
a load status module configured to determine a new load status of the apparatus during the operation of the charging system based at least on the actual values and normal range for each load characteristic, the peer overload threshold value, a current load status, and the peer overload tolerance value; and
wherein the charging system communication module is also configured to broadcast an outgoing status message to at least some of the plurality of charging control function servers, the outgoing status message at least including an identifier for the apparatus, at least a most recent load status for the apparatus, and time information associated with the outgoing status message.

12. An apparatus for providing a charging control function in a charging system, comprising:
a communication module configured to receive a request from a network element of a communication network, the request associated with service provided by the network element in conjunction with a communication session;
a status determining module configured to determine the apparatus is too busy to process the request from the network element; and
a selection module configured to select at least one alternate charging control function server in the charging system based at least on a most recent load status and associated time information received from the at least one alternate charging control function server;
wherein the communication module is also configured to send an answer to the network element, the answer indicating the apparatus is too busy to process the request and identifying each alternate charging control function server selected by the selection module.

13. The apparatus of claim 12, further comprising:
a charging data function server at an input stage of the first charging control function server, the charging data function server comprising the peer characteristics storage module, the charging system communication module, the status message parsing module, the communication module, the status determining module, and the selection module.

14. The apparatus of claim 12, the network element of the communication network comprising:
an accounting communication module configured to send the request to the first charging control function server;
wherein the accounting communication module is also configured to receive the answer from the first charging control function server; and
a peer selection module configured to select a second charging control function server based at least on the at least one alternate charging control function server identified in the answer received from the first charging control function server;
wherein the accounting communication module is also configured to re-send the request to the second charging control function.

15. The apparatus of claim 10 wherein the first charging control function server and the at least some charging control function servers form a first cluster of charging control function servers associated with a first fully qualified domain name, the charging system including at least one other cluster of charging control function servers associated with a different fully qualified domain name.

16. The apparatus of claim 12, the determining by the status determining module that the first charging control function server is too busy further comprising:
if the request received from the network element is a start record for a new communication session in the communication network, determining the first charging control function server is too busy to process the request when a current load status for the first charging control function server is at a first threshold value indicative of a moderate overload condition and higher.

17. The apparatus of claim 16, the determining by the status determining module that the first charging control function server is too busy further comprising:
determining the first charging control function server is too busy to process the request when the current load status for the first charging control function server is at a second threshold value indicative of a severe overload condition and higher.

18. The first apparatus of claim 12 wherein at least one load characteristic is received from the at least some charging control function servers along with the most recent load status and associated time information.

19. The apparatus of claim 18 wherein the at least one load characteristic is stored in the corresponding load information records at the first charging control function server.

20. The apparatus of claim 19, the selecting of the at least one alternate charging control function server by the selection module further comprising:
if the load information records show that multiple alternate charging control function servers are at the normal condition and corresponding associated time information is within the predetermined age threshold from the current date and time, selecting the corresponding alternate charging control function server with a lowest normal load condition from the multiple alternate charging control function servers based at least on the at least one load characteristic in the load information records.

21. The apparatus of claim 12, the selecting of the at least one alternate charging control function server by the alternate selection module further comprising:
if the load information records show that only one alternate charging control function server is at a normal condition and the associated time information is within a predetermined age threshold from a current date and time, selecting the corresponding alternate charging control function server at the normal condition.

22. The apparatus of claim 21, the selecting of the at least one alternate charging control function server by the alternate selection module further comprising:
if the load information records show that multiple alternate charging control function servers are at the normal condition and any of the associated time information is within the predetermined age threshold from the current date and time, selecting the corresponding alternate charging control function server with the associated time information that is closest to the current date and time from the multiple alternate charging control function servers.

23. The apparatus of claim 12, the selecting of the at least one alternate charging control function server by the alternate selection module further comprising:
if the load information records show that multiple alternate charging control function servers are at a normal condition and more than one of the associated time information is within a predetermined age threshold from a current date and time, randomly selecting one of the multiple alternate charging control function servers at the normal condition that are associated with time information within the predetermined age threshold from the current date and time.

24. The apparatus of claim 12, the selecting of the at least one alternate charging control function server by the alternate selection module further comprising:
if the load information records show that multiple alternate charging control function servers are at a normal condition and more than one of the associated time information is within a predetermined age threshold from a current date and time, selecting one of the multiple alternate charging control function servers at the normal condition that are associated with time information within the predetermined age threshold from the current date and time in a round-robin fashion.

25. The apparatus of claim 12, the selecting of the at least one alternate charging control function server by the alternate selection module further comprising:
if the load information records show that multiple alternate charging control function servers are at a normal condition and more than one of the associated time information is within a predetermined age threshold from a current date and time, selecting all of the multiple alternate charging control function servers at the normal condition that are associated with time information within the predetermined age threshold from the current date and time.

26. The apparatus of claim 25 wherein at least one load characteristic is received from the at least some charging control function servers along with the most recent load status and associated time information.

27. The apparatus of claim 26 wherein the at least one load characteristic is stored in the corresponding load information records at the first charging control function server along with the most recent load status and associated time information.

28. The apparatus of claim 27 wherein the alternate charging control function servers selected are prioritized based at least on the at least one load characteristic stored in the load information records.

29. The apparatus of claim 12 wherein the answer sent to the network element includes an alternate-peer attribute-variable pair for each alternate charging control function server selected, each alternate-peer attribute-variable pair identifying the corresponding alternate charging control function server.

* * * * *